US009245495B2

(12) United States Patent
Gupta et al.

(10) Patent No.: US 9,245,495 B2
(45) Date of Patent: Jan. 26, 2016

(54) SIMPLIFICATION OF LOCAL CONTRAST COMPENSATION BY USING WEIGHTED LOOK-UP TABLE

(71) Applicants: Niraj Gupta, Bangalore (IN); Supratim Pal, Bangalore (IN); Mahesh B. Chappalli, Hillsboro, OR (US); Yi-Jen Chiu, San Jose, CA (US); Hong Jiang, El Dorado Hills, CA (US)

(72) Inventors: Niraj Gupta, Bangalore (IN); Supratim Pal, Bangalore (IN); Mahesh B. Chappalli, Hillsboro, OR (US); Yi-Jen Chiu, San Jose, CA (US); Hong Jiang, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,242

(22) PCT Filed: Dec. 21, 2012

(86) PCT No.: PCT/US2012/071483
§ 371 (c)(1),
(2) Date: Dec. 24, 2013

(87) PCT Pub. No.: WO2013/101774
PCT Pub. Date: Jul. 4, 2013

(65) Prior Publication Data
US 2014/0313243 A1 Oct. 23, 2014

(30) Foreign Application Priority Data
Dec. 29, 2011 (IN) .......................... 3863/DEL/2011

(51) Int. Cl.
G09G 5/06 (2006.01)
G09G 5/10 (2006.01)
(Continued)

(52) U.S. Cl.
CPC .. G09G 5/10 (2013.01); G09G 5/06 (2013.01); H04N 5/57 (2013.01); H04N 21/4318 (2013.01); G09G 2320/029 (2013.01); G09G 2320/066 (2013.01)

(58) Field of Classification Search
CPC .................. G09G 2320/0276; G09G 2360/16; G09G 2320/0626; G09G 3/3648; G09G 3/3611; G09G 2320/029; G09G 2320/066; G09G 5/10; G09G 5/06
See application file for complete search history.

(56) References Cited

U.S. PATENT DOCUMENTS 7,460,596 B2    12/2008    Kwon et al.
2006/0023273 A1    2/2006    Kato
(Continued)

FOREIGN PATENT DOCUMENTS

KR    10-2007-0017391 A    2/2007
KR    10-0843817 B1    7/2008
(Continued)

OTHER PUBLICATIONS

International Preliminary Report on Patentability and Written Opinion received for PCT Patent Application No. PCT/US2012/071483, mailed on Jul. 10, 2014, 7 pages.
(Continued)

Primary Examiner — Md Saiful A Siddiqui
(74) Attorney, Agent, or Firm — Lynch Law Patent Group, PC

(57) ABSTRACT

Systems, apparatus, articles, and methods are described including operations to generate a weighted look-up-table based at least in part on individual pixel input values within an active block region and on a plurality of contrast compensation functions. A second level compensation may be performed for a center pixel block of the active region based at least in part on the weighted look-up-table.

25 Claims, 5 Drawing Sheets

(51) Int. Cl.
*H04N 5/57* (2006.01)
*H04N 21/431* (2011.01)

(56) References Cited

U.S. PATENT DOCUMENTS

2008/0310752 A1* 12/2008 Han et al. ............... 382/274
2011/0169856 A1   7/2011 Park et al.
2011/0170775 A1*  7/2011 Manabe ................. 382/167
2013/0016901 A1*  1/2013 Iwaki .................... 382/162

FOREIGN PATENT DOCUMENTS

| KR | 10-2008-0099490 A | 11/2008 |
|---|---|---|
| KR | 10-1027825 B1 | 4/2011 |
| WO | WO2011/118662 * | 9/2011 |
| WO | 2013/101774 A1 | 7/2013 |

OTHER PUBLICATIONS

International Search Report and Written Opinion received for PCT Patent Application No. PCT/US2012/071483, mailed on Apr. 30, 2013, 11 Pages.

Taiwan Decision of Rejections for Taiwan Application No. 101151083 and English translation and remarks, mailed Mar. 31, 2015, 8 pages.

Notice of Preliminary Rejection for Korean Patent Appln. No. 2014-7017835 and English translation and remarks, mailed May 22, 2015, 8 pages.

* cited by examiner

SIMPLIFICATION OF LOCAL CONTRAST COMPENSATION BY USING WEIGHTED LOOK-UP TABLE

BACKGROUND

Current algorithms for performing contrast compensation often utilize multiple piecewise linear function (PWL) lookups. For example, such contrast compensation schemes may do a look-up across multiple PWLs and multiply a weight dependent on the distance in X and Y directions, and derive a final compensated value required for the pixel. This operation may be repeated for every pixel across a block of pixels in the image.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
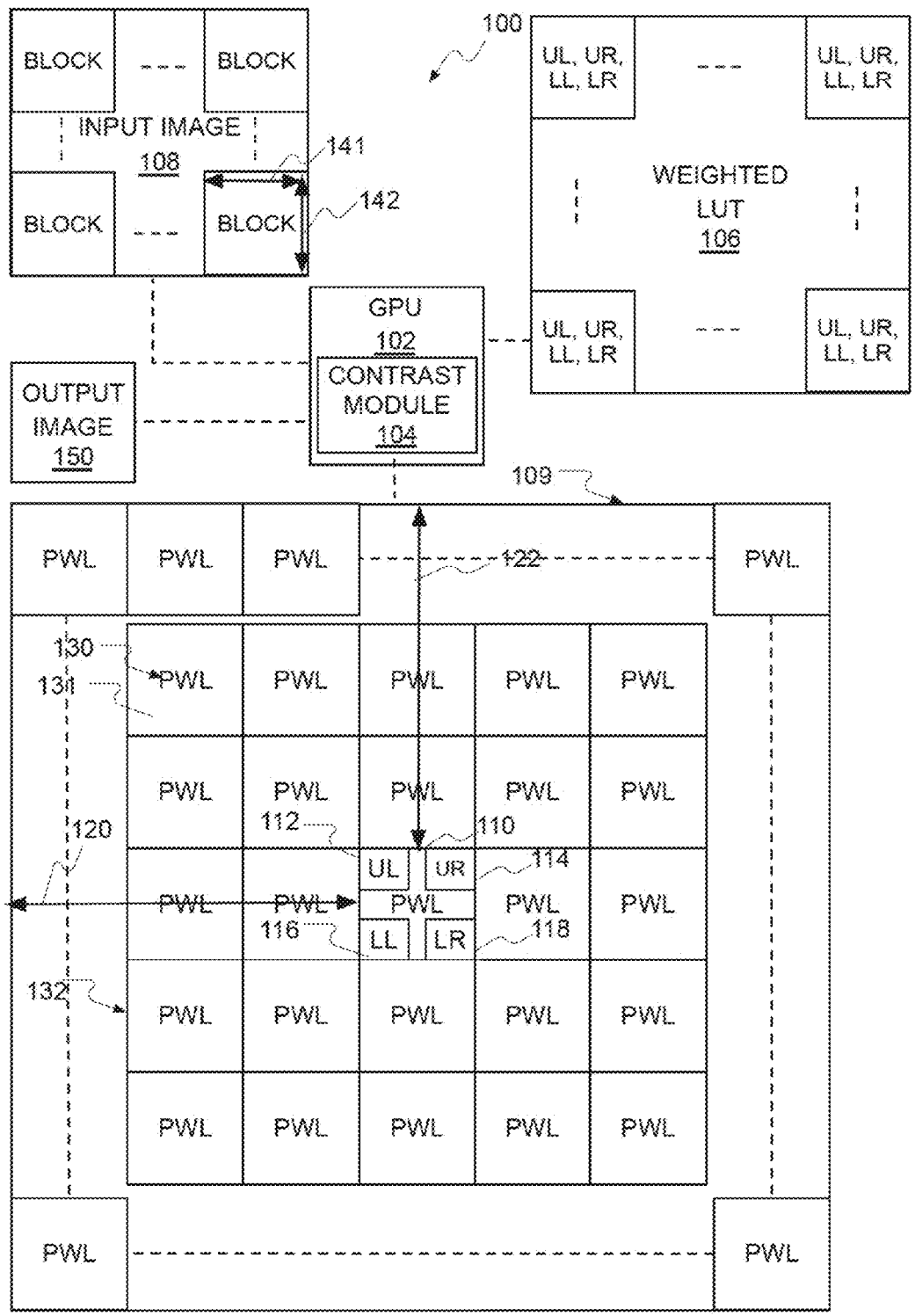
FIG. 1 is an illustrative diagram of an example graphics processing system for local contrast enhancement along with input image, intermediate stages of output, and output image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

As will be described in greater detail below, some example implementation may include operations to generate a weighted look-up-table based at least in part on individual pixel input values within an active block region and on a plurality of contrast compensation functions. A second level compensation may be performed for a center pixel block of the active region based at least in part on the weighted look-up-table.

FIG. 1 is an illustrative diagram of a graphics processing system 100, performing image contrast enhancement, arranged in accordance with at least some implementations of the present disclosure. In the illustrated implementation, graphics processing system 100 may include a graphics processing unit (GPU) 102 may include a contrast module 104. For example, contrast module 104 may be capable of performing contrast compensation.

In some examples, graphics processing system 100 may include additional items that have not been shown in FIG. 1 for the sake of clarity. For example, graphics processing system 100 may include a central processing unit (CPU), radio frequency-type (RF) transceiver, and/or an antenna. Further, graphics processing system 100 may include additional items such as a speaker, a display, an accelerometer, memory, a router, network interface logic, etc. that have not been shown in FIG. 1 for the sake of clarity.

As will be described in greater detail below, contrast module 104 may be capable of generating a weighted look-up-table (LUT) 106. For example, contrast module 104 may be capable of performing contrast compensation of an input image 108 based at least in part on calculations involving weighted look-up-table 106. In some implementations, weighted look-up-table 106 may include values calculated based at least in part on a weighting of a position of four corner coordinates (UL, UR, LL, LR).

For example, an intermediate stage 109 of input image 108 includes a center pixel block 110 that may be associated with the LUT or PWLs created for each block in the image, which would be then used to create the Weighted. LUT with the upper left (UL) 112, the upper right (UR) 114, the lower left (LL) 116, and/or the lower right (LR) 118 values corresponding to the four corners of the center pixel block 110 for every possible pixel value. Values calculated for the four corner coordinates (e.g., UL, UR, LL, LR) 112/114/116/118 of the center pixel block 110 may be stored in weighted LUT 106. Center block 110 may have the horizontal block dimension (block_size_x) 141 and/or vertical block dimension (block_size_y) 142. Each block origin can be represented by horizontal position 120 and vertical position 122. Any pixel within any/all blocks can be represented by horizontal position (x) and vertical position (y) relative to the block origin.

In operation, CPU 104 may be configured to associate a plurality of contrast compensation functions 130 (e.g., such as a piecewise linear function (PWL) and/or a look-up-table (LUT) based on the PWL) with a plurality of individual pixel blocks 131 within an active block region 132 portion of image 108. In some examples, active block region 132 may be a three-by-three square of individual pixel blocks 131, a seven-by-seven square of individual pixel blocks 131, a nine-by-nine square of individual pixel blocks 131, or the like.

Further, the individual pixel bocks 131 may include one or more pixels associated with one or more corresponding pixel input values in image 108. Weighted look-up-table 106 may be generated based at least in part on the individual pixel input values within active block region 132 and on the plurality of contrast compensation functions 130. A second level compensation may be performed for center pixel block 110 based at least in part on weighted look-up-table 106.

For example, GPU 104 may be configured to perform contrast compensation of center pixel block 110 through calculation involving the pixel input values of the few or all individual pixel blocks 131 within an active block region 132. As will be described in greater detail below, weighted look-up-table 106 may include values calculated for the four corner coordinates (e.g., UL, UR, LL, LR) 112/114/116/118, of the center pixel block 110, using the weighted values of the PWLs or LUTS of the surrounding blocks in the active block region 132 based on the distance of the surrounding block to the center pixel block 110 at the four corner positions only for all possible input pixel values.

In the illustrated example, image 108 may be split into multiple blocks 131 and each block 131 may have a contrast compensation function 130 (e.g., such as a piecewise linear function (PWL) and/or a look-up-table (LUT) based on the PWL) created for compensating the pixels within that block 131. To get better quality and smooth transitions, contrast compensation functions 130 of the blocks 131 surrounding center block 110 may be used for compensating the pixels of the center block 110. The PWL (or LUT) compensation for the pixel in the center block may be further compensated by the seven-by-seven active block region 132. This secondary compensation may include a weighted compensation of any PWL in the active block region 132 on center block 110, which may vary depending on the distance of the pixel in center block 110 to a pixel block 131 from which the compensation is being taken from.

In some examples, such a weighted secondary compensation, via weighted look-up-table 106, may operate as a linear function of the distance. For example, a weighted secondary compensation may utilize weighted look-up-table 106 for use in two dimensional or one dimensional interpolation, instead of multiple PWL lookups, where contrast compensation function 130 may be simplified into a single n-dimension equation for pixel compensation. Such a weighted secondary compensation may simplify compensation by not doing multiple PWL lookup for each pixel either in a hardware or software implementation. Instead, such a weighted secondary compensation may utilize simple bilinear two dimensional interpolation. In cases of hardware implementations, such a weighted secondary compensation may reduce the cost in terms of silicon real estate allocated for performance of the compensation considerably. As the number of PWLs increases and the number of points in the PWL increases, the benefit in cost also increases significantly. In cases of software implementation, such a weighted secondary compensation may simplifies the code as multiple PWLs may not be required to be looked up every time for every pixel using the same set of PWL lookups.

Figure 2:
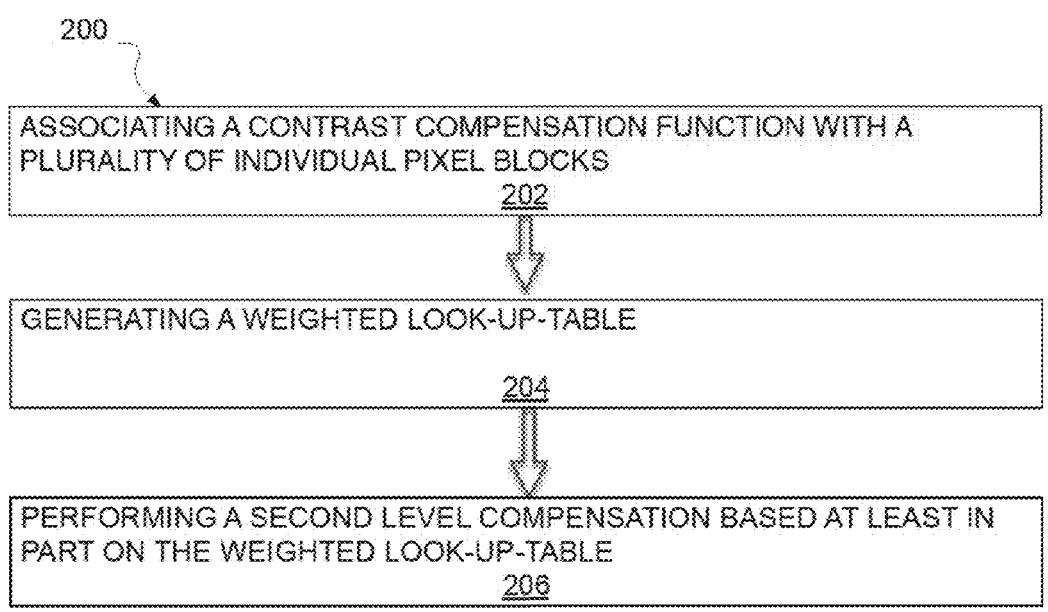
FIG. 2 is a flow chart illustrating an example contrast compensation process.

FIG. 2 is a flow chart illustrating an example contrast compensation process 200, arranged in accordance with at least some implementations of the present disclosure. In the illustrated implementation, process 200 may include one or more operations, functions or actions as illustrated by one or more of blocks 202, 204, and/or 206. By way of non-limiting example, process 200 will be described herein with reference to example graphics processing system 100 of FIG. 1.

Process 200 may begin at block 202, "ASSOCIATING A PLURALITY OF CONTRAST COMPENSATION FUNCTIONS WITH A PLURALITY OF INDIVIDUAL PIXEL BLOCKS", where a plurality of contrast compensation functions may be associated with a plurality of individual pixel blocks. For example, the plurality of contrast compensation functions may be associated with the plurality of individual pixel blocks within an active block region portion of an image. In some examples, the individual pixel hocks may include one or more pixels associated with one or more corresponding pixel input values in the image.

Processing may continue from operation 202 to operation 204, "GENERATING A WEIGHTED LOOK-UP-TABLE", where a weighted look-up-table may be generated. For example, weighted look-up-table may be generated based at least in part on the individual pixel input values within the active block region and on the plurality of contrast compensation functions.

Processing may continue from operation 204 to operation 206, "PERFORMING A SECOND LEVEL COMPENSATION BASED AT LEAST IN PART ON THE WEIGHTED LOOK-UP-TABLE", where a second level compensation may be performed. For example, the second level compensation may be performed for a center pixel block based at least in part on the weighted look-up-table.

Some additional and/or alternative details related to process 200 may be illustrated in one or more examples of implementations discussed in greater detail below with regard to FIG. 3.

Figure 3:
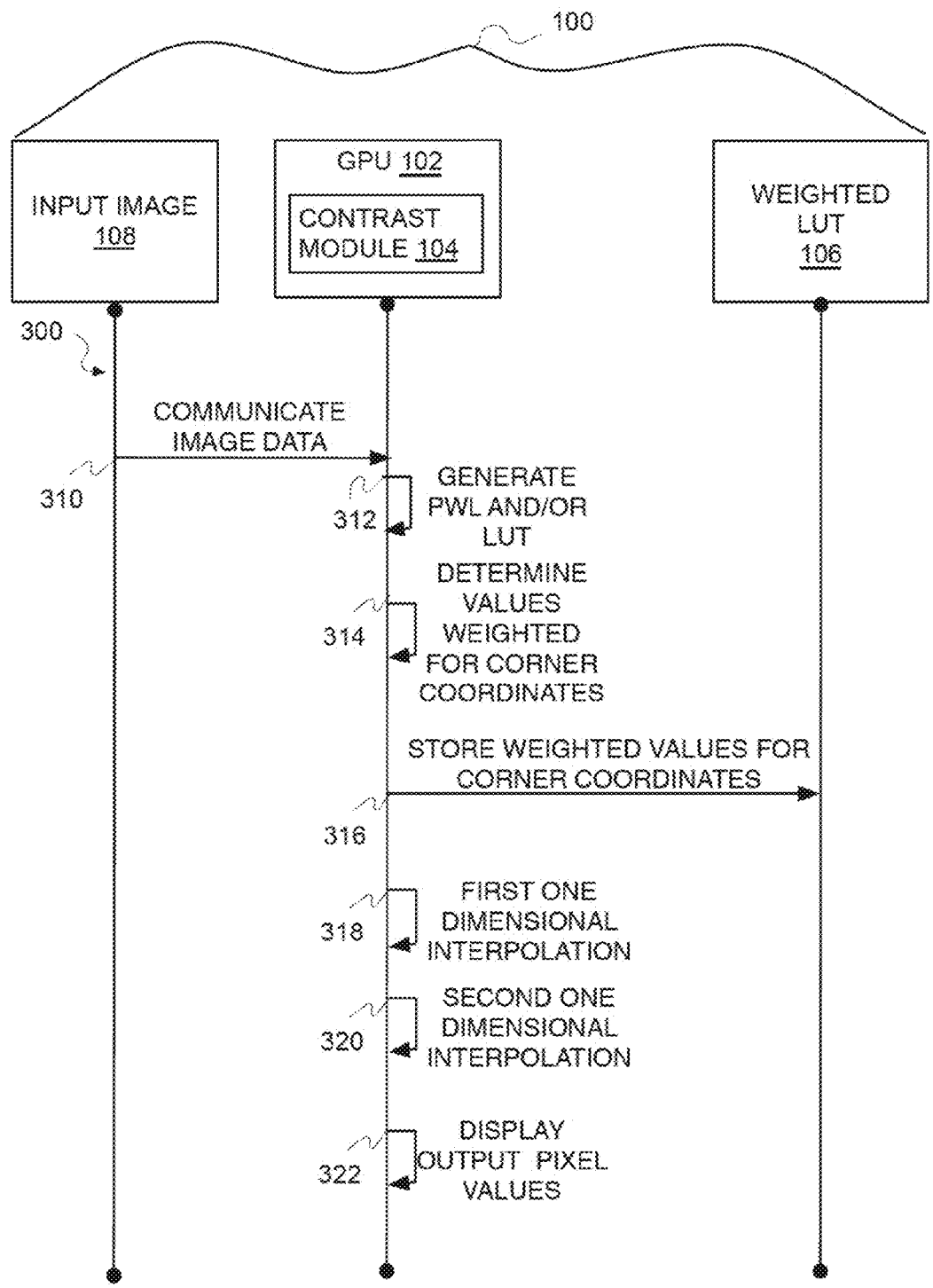
FIG. 3 is an illustrative diagram of an example graphics processing system in operation.

FIG. 3 is an illustrative diagram of example graphics processing system 100 and contrast compensation process 300 in operation, arranged in accordance with at least some implementations of the present disclosure. In the illustrated implementation, process 300 may include one or more operations, functions or actions as illustrated by one or more of actions 310, 312, 314, 316, 318, 320, and/or 322. By way of non-limiting example, process 300 will be described herein with reference to example graphics processing system 100 of FIG. 1.

In the illustrated implementation, graphics processing system 100 may include GPU 102. As illustrated, GPU 102 capable of communication with data from image 108 and/or weighted look-up-table 106. Although graphics processing system 100, as shown in FIG. 3, may include one particular set of blocks or actions associated with particular modules, these blocks or actions may be associated with different modules than the particular module illustrated here.

Process 300 may begin at block 310, "COMMUNICATE IMAGE DATA", where image data may be communicated. For example, image data may be communicated to GPU 102. Such image data may include pixel input values that may be associated with a plurality of individual pixels in image 108.

Processing may continue from operation 310 to operation 312, "GENERATE PWL, AND/OR LUT", where a plurality of contrast compensation functions May be generated and associated with a plurality of individual pixel blocks. For example, the plurality of contrast compensation functions may be associated, via contrast module 104, with the plurality of individual pixel blocks within an active block region portion of an image. In some examples, the individual pixel hocks may include one or more pixels associated with one or more corresponding pixel input values.

In some implementations, the plurality of contrast compensation functions may include a piecewise linear function-type (PWL) contrast compensation function. In other implementations, the plurality of contrast compensation functions may include a look-up-table-type contrast compensation function.

In some implementations, a PWL may be made up of points, bias and slope for each segment. For example, a PWL may be expressed in the following formulation:

Pixel_out=PWL(pixel_in,points[$i$],bias[$i$],slope[$i$])

Where '$i$' may represent the number of points in the PWL. Similarly, the PWL function may be represented as:

```
For(j=0; j< i ; j++){
    If(pixel_in < point[j]){
        k = j−1; break;
    }
}
Pixel_out = (pixel_in − points[k])*slope[k] + bias[k]
```

In some implementations, a result of a PWL can be represented as a look-up-table (LUT) also. However, such a LUT should not be confused with weighted look-up-table 106, which will be discussed in greater detail below. So the above equations can be re-written as:

```
For(j=0; j<=Max_value; j++) {
    LUT(j) = PWL(j, points[i], bias[i], slope[i]);
}
Pixel_out = LUT(pixel_in)
```

Processing may continue from operation 312 to operation 314, "DETERMINE VALUES WEIGHTED FOR CORNER COORDINATES", where values weighted for corner coordinates may be determined. For example, generating weighted look-up-table 106 may include determining, via contrast module 104, intermediate pixel values associated with four corner coordinates (e.g., UL, UR, LL, LR) for individual pixel input values on a pixel block by pixel block basis.

As discussed above, weighted look-up-table 106 may be generated based at least in part on the individual pixel input values within the active block region and on the plurality of contrast compensation functions. In this implementation, the intermediate pixel values may be determined based a least in part on weighting of a position of the four corner coordinates (UL, UR, LL, LR) and on the plurality of contrast compensation functions.

While doing a weighted compensation for the pixel out of many PWLs the representative equation may be written as follows:

```
For(p=0; p<MAX_NUM_PWL_Y; p++){
    For(q=0; q<MAX_NUM_PWL_X; q++){
        Pixel_out = Weight(x,y,p,q)*LUT(p,q,pixel_in);
    }
}
```

Where the Weight(x,y,p,q) portion may represent the function which gives the weight for the input pixel at relative position x,y within the center pixel block 110. Here, (x,y) may represent the relative position of the pixel within the central block, where the center pixel block is under consideration. Similarly all blocks May be considered for the entire input image 108. For example, Weight(x,y,p,q) may represent the function which gives the weight for the pixel at a relative position x,y of the central block with respect to the PWL(p,q) associated with one of the surrounding blocks from which the compensation is being performed. Where p,q may represent the position and/or relative distance of the surrounding block which is being used for compensating the central block. The Weight(x,y,p,q) may vary depending on the pixel position for the pixel that is being compensated within the center pixel block and the (p,q) position that is the relative position of the PWL with respect to the center pixel block from which the pixel is being compensated. Note that the x,y for the UL, UR, LL, and LR in this case is (0,0), (0, block_size_x−1), (block_size_y−1, 0) and (block_size_x−1, block_size_y−1) respectively. This simplification may be used to create the weighted LUT 106 for all the possible pixel values.

The above equations is proposed to be simplified if it is assumed that the weight function is a linear function, as follows:

{UL,UR,LL,LR}=LUT_INTERPOLATE(pixel_in)

Where UL, UR, LL, LR may represent the values of the central block for the extreme four corner positions of the central block, and LUT_INTERPOLATE(pixel_in) may represent weighted look-up-table 106. The weighted LUT 106 may be created for the full range of possible pixel values for input pixel values.

Processing may continue from operation 314 to operation 316, "STORE WEIGHTED VALUES FOR CORNER COORDINATES", where weighted values for corner coordinates may be stored. For example, the intermediate pixel values associated with the four corner coordinates (e.g., UL, UR, LL, LR) may be stored, via contrast module 104, in weighted look-up-table 106. This operation may be repeated for every block in the input image 108.

Processing may continue from operation 316 to operation 318, "FIRST ONE DIMENSIONAL INTERPOLATION", where a first one dimensional interpolation may be performed. For example, performing the second level compensation, via contrast module 104, for the center pixel block may further include performance of a first one dimensional interpolation.

In some implementations, a first one dimensional interpolation may be performed based at least in part on weighted look-up-table 106. The first one dimensional interpolation may be associated with a first dimensions (e.g. a horizontal dimension) of the image. In some examples, the first one dimensional interpolation may be based at least in part on a first portion associated with a first half (e.g., UL, UR) of the four corner coordinates and a second portion associated with a second half (e.g., LL, LR) of the four corner coordinates.

The final pixel may be derived starting by using a first one dimensional interpolation as follows:

$$U\_pix=UL*(blk\_size\_x-x)+UR*x$$

$$L\_pix=LL*(blk\_size\_x-x)+LR*x$$

Where U_pix may represent a horizontal (or vertical) partial interpolation associated with a first half (e.g., UL, UR) of the four corner coordinates. Similarly. L_pix may represent a horizontal (or vertical) partial interpolation associated with a second half (e.g., LL, LR) of the four corner coordinates. Further, the term "x" may represent horizontal (or vertical) location of the pixel in the center block, while "blk_size_x" may represent the size of the center block region.

Processing may continue from operation 318 to operation 320, "SECOND ONE DIMENSIONAL INTERPOLATION", where a second one dimensional interpolation may be performed. For example, performing the second level compensation, via contrast module 104, for the center pixel block may further include performance of a second one dimensional interpolation.

In some implementations, an output pixel value may be determined for the center pixel block via the second one dimensional interpolation. For example, the second one dimensional interpolation may be performed based at least in part on the determined first one dimensional interpolation, where the second one dimensional interpolation is associated with a second dimension (e.g. a vertical dimension) of the image different from the first dimension (e.g. a horizontal dimension) associated with the first one dimensional interpolation.

The final pixel may be derived using a second one dimensional interpolation as follows:

$$Pixel\_out=U\_pix*(blk\_size\_y-y)+L\_pix*y$$

Where U_pix and L_pix were determined at operation 318. Further, the term "y" may represent the vertical (or horizontal) location of the pixel in the center block, while "blk_size_y" may represent the size of the center block region and/or all blocks in the second dimension (e.g., vertical dimension).

Although this example has represented operations 318-320 as a two-step one-dimension interpolation, it is not necessary that the interpolation be carried in two steps. Accordingly, in some implementations, an operation performing the same or similar function as operations 318-320 may be carried out in a single step. The illustrated two-step one-dimension interpolation illustrates one example as to how the weighted LUT 106 value (UL, LL, UR, LR) may be used to compensate the pixels in the block for which the weighted LUT 106 has been created. The weighted LUT 106 may be created for every block in the input image 108.

The above simplification of creating the weighted LUT 106 and using the same to determine the output pixel as described above, can be implemented in silicon and may not require multiple PWLs to be looked-up simultaneously.

In some implementations, there may be a software pass to create the LUT_INTERPOLATE to simplify the hardware or software implementation. Such an operation may be performed, where for every pixel value of the center block, LUT of the center block along with the LUT of the surrounding blocks of the active block region in consideration, the pixel values may be used to create the weighed LUT 106 for the four corners of the center block, using the weighted values of the LUT with respect to each of the surrounding blocks and stored it in weighted look-up-table 106.

As a proof of concept for a single dimension, assume for a pixel in the center block at relative position (x) within the block, for the input pixel, the output of the PWL is given as =Pi. The weight depends on the distance on the pixel at position x with respect to the PWL or LUT (p,q) from which the compensation is being taken, is a linear function can be given as =ai*x+bi. Then the output for the input pixel at (x) because of $PWL_i(p,q)$ or $LUT_i(p,q)$ can be represented as =Pi*(ai*x+bi). So the final output for a number n PWLs can be given as =ΣPi*(ai*x+bi)//for i=0 to n−1=(ΣPi*ai)*x+(ΣPi*bi)+A*x+B. Which is a linear equation. This proof is for one dimension, but can be easily extended to 2D or a plane equation and can be further extended to n-dimensions. For 2D, the four extreme points {UL, UR, LL, and LR} as sited above may be derived out of the plane equation derived here and loaded into weighted look-up-table 106.

Processing may continue from operation 320 to operation 322, "DISPLAY OUTPUT PIXEL VALUES", where output pixel values may be displayed. For example, output pixel values may be communicated, via GPU 102, to a display (not shown) for eventual display of a modified image to a user.

For example, after completion of operations 310-320, process 300 may repeat operations 310-320 to process all the designated input images 108 (or frames). Upon completion of processing designated input images 108, process 300 may output one or more contrast enhanced images.

In operation, process 300 (and/or process 200) can be used to simplify the local adaptive contrast enhancement (LACE) algorithm. For example, process 300 may utilize a scalable and simplified implementation method for multiple piecewise linear function to compensate for each pixel. During image processing like LACE, multiple PWLs or LUTS may be used for compensating the center pixel block of an active block region of varying size. To compensate the pixels in a central block of an active region, process 300 may utilize multiple PWL functions using weighting, which may operate as a function of the distance between one of the four corners of center block and one of the surrounding pixel blocks whose PWL is used to compensate the center block. The weighting may be is a function of distance both in X and Y direction in case of the image and hence a 2D compensation may be used. The weights may be assumed to be a linear increasing or decreasing function used to compensate the pixel, as it is dependent on the distance.

To simplify the implementation by performing multiple PWL lookup, depending on the number of PWLs used to compensate a pixel in the center pixel block, process 300 may utilize weighted look-up-table 106 with the calculated values of the four corners of the center block to compensate the pixel in the center pixel block using simple bilinear interpolation in both X and Y direction. Alternatively, process 300 may utilize a weighted LUT containing a plane equation since the function may be dependent on both X and Y directions. This concept can be extended to any function of any dimension, in case the function defining the weights can be represented in an equation form. The corresponding coefficients can be stored for the equation per pixel value and then used to compute the compensated output pixel using the corresponding equation implemented in either software or hardware in the contrast enhancement module 104.

In operation, process 300 (and/or process 200) may operate without the use of multiple LUT and/or PWL for compensating the pixels in the center block, but instead create the weighted LUT 106 using such multiple LUT and/or PWL. The weighted LUT 106 may be represented by the plane equation or can be represented by four values at the corners (UL, LL, LR, UR) of the block being compensated (e.g., the center block) for every possible pixel value. The weighted LUT 106 may be created for every block in the input image 108 with the active region being the surrounding blocks for which PWL or LUT may be used to create the weighted LUT 106. This can be thought as the active region moving across the input image 108, scanning the whole input image 108 in blocks. The blocks can be overlapping or non-overlapping. For simplicity here, process 300 was discussed with regard to non-overlapping blocks. But in Local contrast enhancement, both overlapping and non-overlapping blocks may be utilized.

Process 300 may create a linear equation in case of one dimensional (1D) compensation and a plane equation in case of two dimensional (2D) compensation of pixels usually used in image processing using multiple piecewise linear (PWL) functions. Additionally, the methods described herein may be extended to n-dimensions (e.g., a $3^{rd}$ dimension can be utilized if m-frames are used across the center frame which is intended to be compensated in a video), if required. In some implementations, process 300 may create weighted look-up-table 106 associated with each entry or pixel value, which may be compensated by either a linear or plane equation for 1D and 2D compensation respectively. The coefficients required for solving the 1D and 2D compensation may be stored in the look-up-table. Accordingly, simplification may be possible in software or hardware, which may use the same set of piecewise linear functions to compensate the pixel across multiple frames and multiple pixels within the frame or block of pixels.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 4 and 5 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
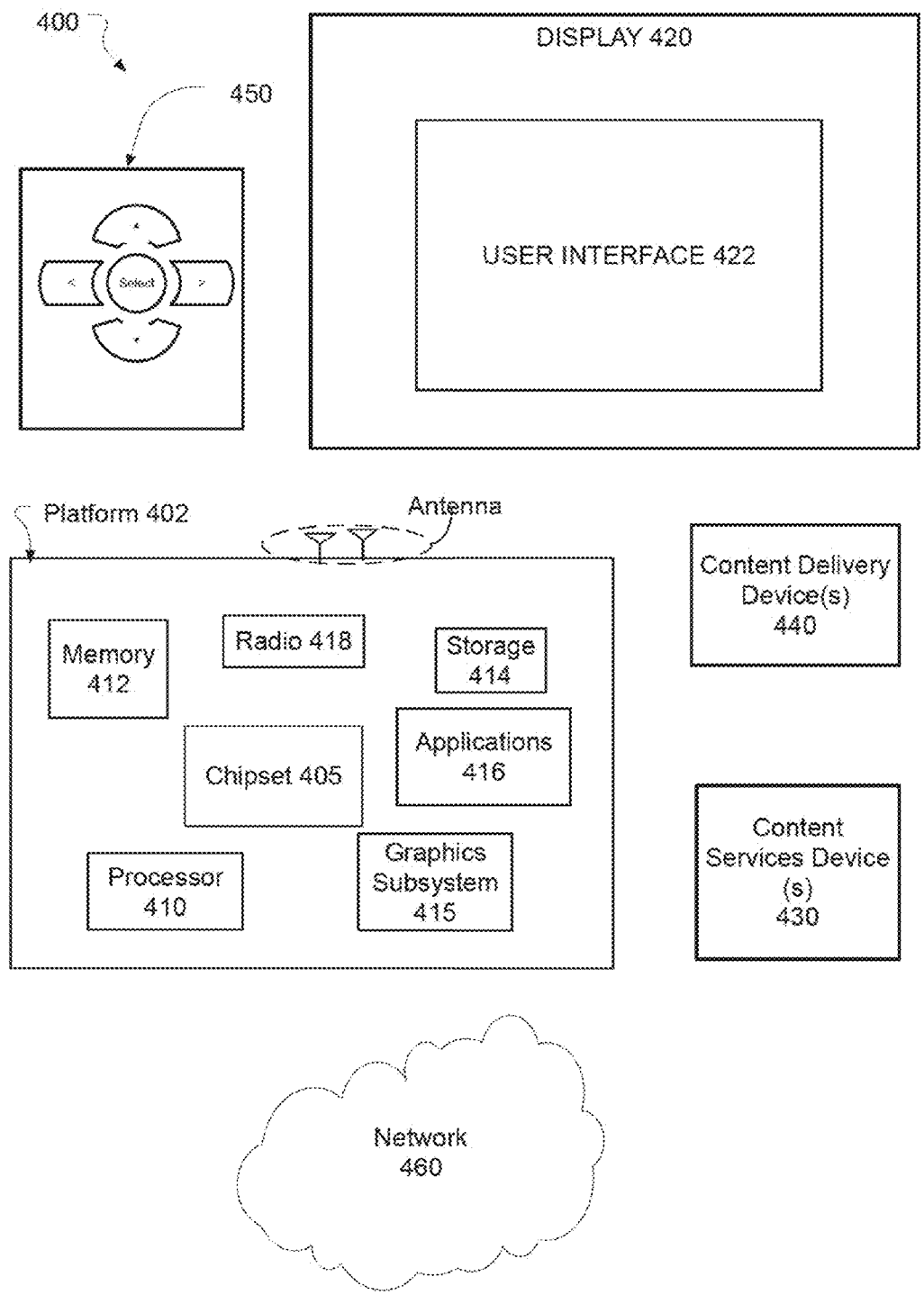
FIG. 4 is an illustrative diagram of an example system.

FIG. 4 illustrates an example system 400 in accordance with the present disclosure. In various implementations, system 400 may be a media system although system 400 is not limited to this context. For example, system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, server and so forth.

In various implementations, system 400 includes a platform 402 coupled to a display 420. Platform 402 may receive content from a content device such as content services device(s) 430 or content delivery device(s) 440 or other similar content sources. A navigation controller 450 including one or more navigation features may be used to interact with, for example, platform 402 and/or display 420. Each of these components is described in greater detail below.

In various implementations, platform 402 may include any combination of a chipset 405, processor 410, memory 412, storage 414, graphics subsystem 415, applications 416 and/or radio 418. Chipset 405 may provide intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented as a Complex Instruction Set Computer (CISC) or Reduced Instruction Set Computer (RISC) processors; x86 instruction set compatible processors, multi-core, or any other microprocessor or central processing unit (CPU), in various implementations, processor 410 may be dual-core processor(s), dual-core mobile processor(s), and so forth.

Memory 412 may be implemented as a volatile memory device such as, but not limited to, a Random Access Memory (RAM), Dynamic Random Access Memory (DRAM), or Static RAM (SRAM).

Storage 414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 414 may include technology to increase the storage performance enhanced protection for valuable digital media when multiple hard drives are included, for example.

Graphics subsystem 415 may perform processing of images such as still or video for display. Graphics subsystem 415 may be a graphics processing unit (GPU) or a visual processing unit (VPU), for example. An analog or digital interface may be used to communicatively couple graphics subsystem 415 and display 420. For example, the interface may be any of a High-Definition Multimedia Interface, DisplayPort, wireless HDMI, and/or wireless HD compliant techniques. Graphics subsystem 415 may be integrated into processor 410 or chipset 405. In some implementations, graphics subsystem 415 may be a stand-alone card communicatively coupled to chipset 405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In various implementations, display 420 may include any television type monitor or display. Display 420 may include, for example, a computer display screen, touch screen display, video monitor, television-like device, and/or a television. Display 420 may be digital and/or analog. In various implementations, display 420 may be a holographic display. Also, display 420 may be a transparent surface that may receive a visual projection. Such projections may convey various forms of information, images, and/or objects. For example, such projections may be a visual overlay for a mobile augmented reality (MAR) application. Under the control of one or more software applications 416, platform 402 may display user interface 422 on display 420.

In various implementations, content services device(s) 430 may be hosted by any national, international and/or independent service and thus accessible to platform 402 via the Internet, for example. Content services device(s) 430 may be coupled to platform 402 and/or to display 420. Platform 402 and/or content services device(s) 430 may be coupled to a network 460 to communicate (e.g., send and/or receive) media information to and from network 460. Content delivery device(s) 440 also may be coupled to platform 402 and/or to display 420.

In various implementations, content services device(s) 430 may include a cable television box, personal computer, network, telephone, Internet enabled devices or appliance capable of delivering digital information and/or content, and any other similar device capable of unidirectionally or bidirectionally communicating content between content providers and platform 402 and/display 420, via network 460 or directly. It will be appreciated that the content may be communicated unidirectionally and/or bidirectionally to and from any one of the components in system 400 and a content provider via network 460. Examples of content may include any media information including, for example, video, music, medical and gaming information, and so forth.

Content services device(s) 430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 402 may receive control signals from navigation controller 450 having one or more navigation features. The navigation features of controller 450 may be used to interact with user interface 422, for example. In embodiments, navigation controller 450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 450 may be replicated on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422, for example. In embodiments, controller 450 may not be a separate component but may be integrated into platform 402 and/or display 420. The present disclosure, however, is not limited to the elements or in the context shown or described herein.

In various implementations, drivers (not shown) may include technology to enable users to instantly turn on and off platform 402 like a television with the touch of a button after initial boot-up, when enabled, for example. Program logic may allow platform 402 to stream content to media adaptors or other content services device(s) 430 or content delivery device(s) 440 even when the platform is turned "off". In addition, chipset 405 may include hardware and/or software support for (5.1) surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 400 may be integrated. For example, platform 402 and content services device(s) 430 may be integrated, or platform 402 and content delivery device(s) 440 may be integrated, or platform 402, content services device(s) 430, and content delivery device(s) 440 may be integrated, for example. In various embodiments, platform 402 and display 420 may be an integrated unit. Display 420 and content service device(s) 430 may be integrated, or display 420 and content delivery device(s) 440 may be integrated, for example. These examples are not meant to limit the present disclosure.

In various embodiments, system 400 may be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 402 may establish one or more logical or physical channels to communicate information. The information may include media information and control information. Media information may refer to any data representing content meant for a user. Examples of content may include, for example, data from a voice conversation, videoconference, streaming video, electronic mail remain message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
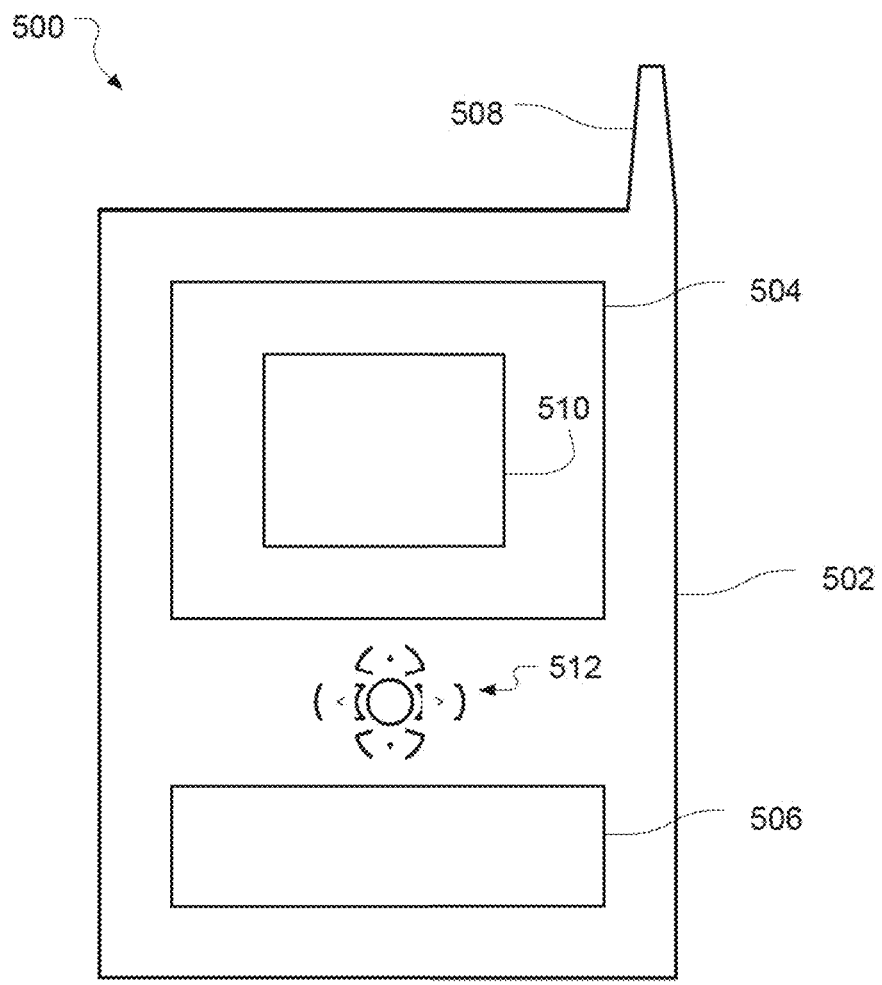
FIG. 5 is an illustrative diagram of an example system, all arranged in accordance with at least some implementations of the present disclosure.

As described above, system 400 may be embodied in varying physical styles or form factors. FIG. 5 illustrates implementations of a small form factor device 500 in which system 400 may be embodied. In embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 500 may include a housing 502, a display 504, an input/output (I/O) device 506, and an antenna 508. Device 500 also may include navigation features 512. Display 504 may include any suitable display unit for displaying information appropriate for a mobile computing device. I/O device 506 may include any suitable I/O device for entering information into a mobile computing device. Examples for I/O device 506 may include an alphanumeric keyboard, a numeric keypad, a touch pad, input keys, buttons, switches, rocker switches, microphones, speakers, voice recognition device and software, and so forth. Information also may be entered into device 500 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing, facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A computer-implemented method, comprising:
associating a plurality of contrast compensation functions with a plurality of individual pixel blocks within an active block region portion of an image, wherein individual pixel bocks include one or more pixels associated with a one or more corresponding pixel input values;
generating a weighted look-up-table based at least in part on the individual pixel input values within the active block region and on the plurality of contrast compensation functions;
performing a second level compensation for a center pixel block of the active region based at least in part on the weighted look-up-table; and
determining a first one dimensional interpolation based at least in part on the weighted look-up-table, wherein the first one dimensional interpolation is associated with a first dimension of the image, wherein the first one dimensional interpolation is based at least in part on a first portion associated with a first half of a four corner coordinates and a second portion associated with a second half of the four corner coordinates;
wherein generating the weighted look-up-table further comprises determining intermediate pixel values associated with four non-center corner coordinates for individual pixel input values on a pixel block by pixel block basis, wherein the intermediate pixel values associated with the four corner coordinates are stored in the weighted look-up-table.

2. The method of claim 1, wherein the plurality of contrast compensation functions comprises a piecewise linear function-type contrast compensation function.

3. The method of claim 1, wherein the plurality of contrast compensation functions comprises a look-up-table-type contrast compensation function.

4. The method of claim 1, wherein the intermediate pixel values are determined based a least in part on weighting of a position of the four corner coordinates and on the plurality of contrast compensation functions.

5. The method of claim 1, wherein performing the second level compensation for the center pixel block of the active region further comprises:

determining a first one dimensional interpolation based at least in part on the weighted look-up-table, wherein the first one dimensional interpolation is associated with a first dimension of the image; and determining an output pixel value for the center pixel block of the active region via a second one dimensional interpolation based at least in part on the determined first one dimensional interpolation, wherein the second one dimensional interpolation is associated with a second dimension of the image.

6. The method of claim 1, wherein performing the second level compensation for the center pixel block of the active region further comprises:

determining a first one dimensional interpolation based at least in part on the weighted look-up-table, wherein the first one dimensional interpolation is associated with a first dimension of the image, wherein the first one dimensional interpolation is based at least in part on a first portion associated with a first half of the four corner coordinates and a second portion associated with a second half of the four corner coordinates; and determining an output pixel value for the center pixel block of the active region via a second one dimensional interpolation based at least in part on the determined first one dimensional interpolation, wherein the second one dimensional interpolation is associated with a second dimension of the image.

7. The method of claim 1, wherein the plurality of contrast compensation functions comprises a piecewise linear function-type contrast compensation function or a look-up-table-type contrast compensation function, wherein generating the weighted look-up-table further comprises:

wherein the intermediate pixel values are determined based a least in part on weighting of a position of the four corner coordinates and on the plurality of contrast compensation functions, wherein performing the second level compensation for the center pixel block of the active region further comprises:

determining a first one dimensional interpolation based at least in part on the weighted look-up-table, wherein the first one dimensional interpolation is associated with a first dimension of the image, wherein the first one dimensional interpolation is based at least in part on a first portion associated with a first half of the four corner coordinates and a second portion associated with a second half of the four corner coordinates; and determining an output pixel value for the center pixel block of the active region via a second one dimensional interpolation based at least in part on the determined first one dimensional interpolation, wherein the second one dimensional interpolation is associated with a second dimension of the image.

8. A non-transitory computer-readable storage medium having stored therein a plurality of instructions cause an apparatus to execute a method comprising:

associating a plurality of contrast compensation functions with a plurality of individual pixel blocks within an active block region portion of an image, wherein individual pixel bocks include one or more pixels associated with one or more corresponding pixel input values;

generating a weighted look-up-table based at least in part on the individual pixel input values within the active block region and on the plurality of contrast compensation functions;

performing a second level compensation for a center pixel block of the active region based at least in part on the weighted look-up-table; and determining a first one dimensional interpolation based at least in part on the weighted look-up-table, wherein the first one dimensional interpolation is associated with a first dimension of the image, wherein the first one dimensional interpolation is based at least in part on a first portion associated with a first half of a four corner coordinates and a second portion associated with a second half of the four corner coordinates;

wherein generating the weighted look-up-table further comprises determining intermediate pixel values associated with four non-center corner coordinates for individual pixel input values on a pixel block by pixel block basis, wherein the intermediate pixel values associated with the four corner coordinates are stored in the weighted look-up-table.

9. The computer-readable storage medium of claim 8, wherein the plurality of contrast compensation functions comprises a piecewise linear function-type contrast compensation function.

10. The computer-readable storage medium of claim 8, wherein the plurality of contrast compensation functions comprises a look-up-table-type contrast compensation function.

11. The computer-readable storage medium of claim 8, wherein the intermediate pixel values are determined based at least in part on weighting of a position of the four corner coordinates and on the plurality of contrast compensation functions.

12. The computer-readable storage medium of claim 8, wherein performing the second level compensation for the center pixel block of the active region further comprises:

determining a first one dimensional interpolation based at least in part on the weighted look-up-table, wherein the first one dimensional interpolation is associated with a first dimension of the image; and determining an output pixel value for the center pixel block of the active region via a second one dimensional interpolation based at least in part on the determined first one dimensional interpolation, wherein the second one dimensional interpolation is associated with a second dimension of the image.

13. The computer-readable storage medium of claim 8, wherein performing the second level compensation for the center pixel block of the active region further comprises:

determining a first one dimensional interpolation based at least in part on the weighted look-up-table, wherein the first one dimensional interpolation is associated with a first dimension of the image, wherein the first one dimensional interpolation is based at least in part on a first portion associated with a first half of the four corner coordinates and a second portion associated with a second half of the four corner coordinates; and determining an output pixel value for the center pixel block of the active region via a second one dimensional interpolation based at least in part on the determined first one dimensional interpolation, wherein the second one dimensional interpolation is associated with a second dimension of the image.

14. An apparatus, comprising:

a server, wherein the server is communicatively coupled over a network to another device with a display, wherein the server is configured to:

associate a plurality of contrast compensation functions with a plurality of individual pixel blocks within an active block region portion of an image, wherein individual pixel bocks include one or more pixels associated with one or more corresponding pixel input values;
generate a weighted look-up-table based at least in part on the individual pixel input values within the active block region and on the plurality of contrast compensation functions;
perform a second level compensation for a center pixel block of the active region based at least in part on the weighted look-up-table; and
determine a first one dimensional interpolation based at least in part on the weighted look-up-table, wherein the first one dimensional interpolation is associated with a first dimension of the image, wherein the first one dimensional interpolation is based at least in part on a first portion associated with a first half of a four corner coordinates and a second portion associated with a second half of the four corner coordinates;
wherein generating the weighted look-up-table further comprises a determination of intermediate pixel values associated with four non-center corner coordinates for individual pixel input values on a pixel block by pixel block basis, wherein the intermediate pixel values associated with the four corner coordinates are stored in the weighted look-up-table.

15. The apparatus of claim 14, wherein the plurality of contrast compensation functions comprises a piecewise linear function-type contrast compensation function.

16. The apparatus of claim 14, wherein the plurality of contrast compensation functions comprises a look-up-table-type contrast compensation function.

17. The apparatus of claim 14, wherein the intermediate pixel values are determined based a least in part on weighting of a position of the four corner coordinates and on the plurality of contrast compensation functions.

18. The apparatus of claim 14, wherein performing the second level compensation for the center pixel block of the active region further comprises:
determine a first one dimensional interpolation based at least in part on the weighted look-up-table, wherein the first one dimensional interpolation is associated with a first dimension of the image; and
determine an output pixel value for the center pixel block of the active region via a second one dimensional interpolation based at least in part on the determined first one dimensional interpolation, wherein the second one dimensional interpolation is associated with a second dimension of the image.

19. The apparatus of claim 14, wherein performing the second level compensation for the center pixel block of the active region further comprises:
determine a first one dimensional interpolation based at least in part on the weighted look-up-table, wherein the first one dimensional interpolation is associated with a first dimension of the image, wherein the first one dimensional interpolation is based at least in part on a first portion associated with a first half of the four corner coordinates and a second portion associated with a second half of the four corner coordinates; and
determine an output pixel value for the center pixel block of the active region via a second one dimensional interpolation based at least in part on the determined first one dimensional interpolation, wherein the second one dimensional interpolation is associated with a second dimension of the image.

20. A system comprising:
a display;
a processor, wherein the processor is communicatively coupled to the display, wherein the processor configured to:
associate a plurality of contrast compensation functions with a plurality of individual pixel blocks within an active block region portion of an image, wherein individual pixel bocks include one or more pixels associated with one or more corresponding pixel input values;
generate a weighted look-up-table based at least in part on the individual pixel input values within the active block region and on the plurality of contrast compensation functions;
perform a second level compensation for a center pixel block of the active region based at least in part on the weighted look-up-table; and
determine a first one dimensional interpolation based at least in part on the weighted look-up-table, wherein the first one dimensional interpolation is associated with a first dimension of the image, wherein the first one dimensional interpolation is based at least in part on a first portion associated with a first half of a four corner coordinates and a second portion associated with a second half of the four corner coordinates;
wherein generating the weighted look-up-table further comprises a determination of intermediate pixel values associated with four non-center corner coordinates for individual pixel input values on a pixel block by pixel block basis, wherein the intermediate pixel values associated with the four corner coordinates are stored in the weighted look-up-table.

21. The system of claim 20, wherein the plurality of contrast compensation functions comprises a piecewise linear function-type contrast compensation function.

22. The system of claim 20, wherein the plurality of contrast compensation functions comprises a look-up-table-type contrast compensation function.

23. The system of claim 20, wherein the intermediate pixel values are determined based a least in part on weighting of a position of the four corner coordinates and on the plurality of contrast compensation functions.

24. The system of claim 20, wherein performing the second level compensation for the center pixel block of the active region further comprises:
determine a first one dimensional interpolation based at least in part on the weighted look-up-table, wherein the first one dimensional interpolation is associated with a first dimension of the image; and
determine an output pixel value for the center pixel block of the active region via a second one dimensional interpolation based at least in part on the determined first one dimensional interpolation, wherein the second one dimensional interpolation is associated with a second dimension of the image.

25. The system of claim 20, wherein performing the second level compensation for the center pixel block of the active region further comprises:
determine a first one dimensional interpolation based at least in part on the weighted look-up-table, wherein the first one dimensional interpolation is associated with a first dimension of the image, wherein the first one dimensional interpolation is based at least in part on a first portion associated with a first half of the four corner coordinates and a second portion associated with a second half of the four corner coordinates; and determine an output pixel value for the center pixel block of the active region via a second one dimensional interpolation based at least in part on the determined first one dimensional interpolation, wherein the second one dimensional interpolation is associated with a second dimension of the image.

\* \* \* \* \*